United States Patent
Logan et al.

(10) Patent No.: US 11,475,049 B2
(45) Date of Patent: Oct. 18, 2022

(54) METHODS AND SYSTEMS FOR ORGANIZATION EXTENSIBILITY AND CLUSTER SCALABILITY

(71) Applicant: salesforce.com, inc., San Francisco, CA (US)

(72) Inventors: Robert Stephen Logan, Trumbull, CT (US); Gabriel Such Tobias, San Jose, CA (US); Shan-Cheng Ho, Sunnyvale, CA (US)

(73) Assignee: SALESFORCE, INC., San Francisco, CA (US)

( * ) Notice: Subject to any disclaimer, the term of this patent is extended or adjusted under 35 U.S.C. 154(b) by 261 days.

(21) Appl. No.: 16/779,160

(22) Filed: Jan. 31, 2020

(65) Prior Publication Data
US 2021/0240738 A1   Aug. 5, 2021

(51) Int. Cl.
G06F 16/30 (2019.01)
G06F 16/28 (2019.01)
G06F 16/22 (2019.01)
G06F 16/21 (2019.01)

(52) U.S. Cl.
CPC .......... G06F 16/285 (2019.01); G06F 16/214 (2019.01); G06F 16/2272 (2019.01)

(58) Field of Classification Search
CPC .. G06F 16/285; G06F 16/3372; G06F 16/214; G06F 16/30; G06F 16/2272
USPC ........ 707/609, 687, 705, 769, 790, 813, 821
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

"Google Plus Users", Google+Ripples; Oct. 31, 2011; 3 pages.

*Primary Examiner* — Sana A Al-Hashemi
(74) *Attorney, Agent, or Firm* — Schwabe Williamson & Wyatt

(57) ABSTRACT

A computer-implemented method is disclosed. The method includes determining whether a level of resource utilization of an organization having a first index and a first cluster requires that the organization is assigned to a second cluster, if the level of resource utilization requires that the organization is assigned to the second cluster, creating a second index for the organization in the second cluster, adding a consul entry in a consul that points to the second index, and upon completion of a data migration operation, changing an entry of the cluster routing controller for the organization, from the first index to the second index. A connection is established using the consul entry.

20 Claims, 7 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,397,545 B2 * | 8/2019 | Yu .......................... G02B 3/005 |
| 10,762,109 B2 | 9/2020 | Rushan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0287937 A1* | 11/2012 | Kaya ................. H04L 45/28 370/401 |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2017/0213127 A1* | 7/2017 | Duncan ................. G16B 50/30 |
| 2018/0114126 A1* | 4/2018 | Das ...................... G06F 16/338 |
| 2018/0145725 A1* | 5/2018 | Pandey ................. H04B 3/232 |
| 2019/0156817 A1* | 5/2019 | Li ......................... H03M 7/3082 |
| 2020/0134081 A1 | 4/2020 | Ho |
| 2020/0294642 A1* | 9/2020 | Bostic ................. G06K 9/6289 |
| 2020/0311637 A1 | 10/2020 | Benani et al. |
| 2021/0034627 A1 | 2/2021 | Mehta et al. |

\* cited by examiner

METHODS AND SYSTEMS FOR ORGANIZATION EXTENSIBILITY AND CLUSTER SCALABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to organization extensibility and cluster scalability, and more specifically to methods and systems for organization extensibility and cluster scalability.

BACKGROUND

Cloud storage of searchable org data (via ElasticSearch™) is a delicate balance of providing limitless organizational extensibility against cost to serve (CTS). For example, an "easy" solution to physical storage constraints could be allotting an entire duster to each individual organization. However, the cost to cloud based software companies would be astronomical. Therefore, the problem of accommodating growth while minimizing cost requires a solution in these two areas: Organizational data must be able to grow without physical constraints (extensibility) and cloud based software company itself must accommodate limitless existing and future customer organizations (scalability).

From the perspective of site reliability engineering (SRE), requests to provide more customer organization capacity (beyond the original allotment) are inevitable. Previous approaches do not provide an adequate way of seamlessly handling this process. With regard to searches specifically (where performance is most critical), an incoming query must be able to identify the data center, duster, node and index name(s) involved in obtaining a connection and a subsequent search result. Previous approaches do not provide an adequate manner of obtaining the search result in an environment where the target data (organization search data) location may need to change and where every millisecond counts.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example System Overview

Figure 1A:
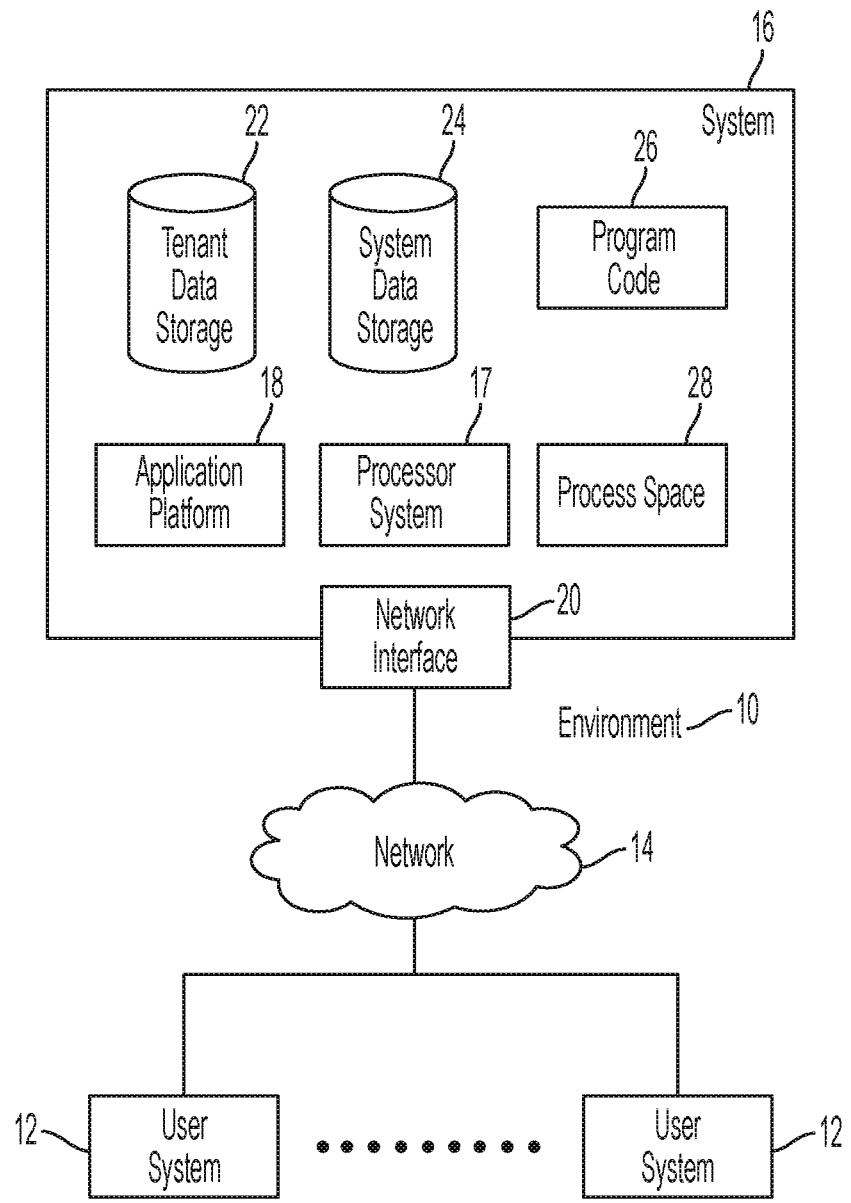
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having nontransitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
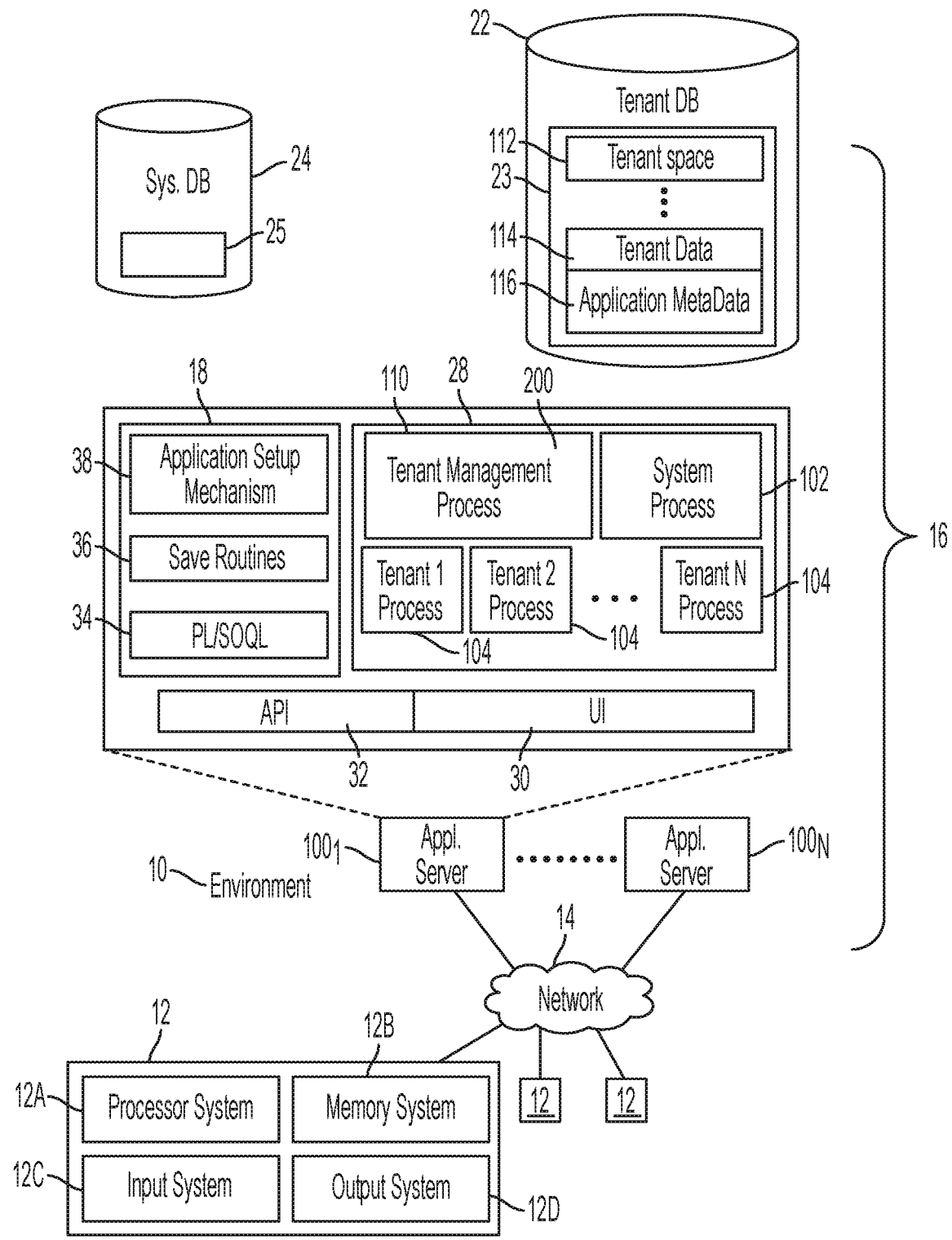
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multitenant physical table, which may contain multiple logical tables per organization. It is transparent to customers that their multiple "tables" are in fact stored in one large table or that their data may be stored in the same table as the data of other customers.

It should be appreciated that one or more embodiments described herein can be implemented in other systems and environments, including but not limited to database systems, client-server models, mobile technology and devices, wearable devices, on demand services, etc.

System for Organization Extensibility and Cluster Scalability

From the perspective of site reliability engineering (SRE), in the provision of cloud based services, requests to provide more customer organization capacity (beyond the original allotment) are inevitable. Previous approaches do not provide an adequate way of seamlessly handling this process. With regard to searches (where performance is most critical), an incoming query must be able to speedily identify the data center, duster, node and index name(s) involved in obtaining a connection and a subsequent search result. Previous approaches do not provide an adequate manner of obtaining the search result in an environment where the target data (organization search data) location may need to change and where every millisecond counts.

An approach that addresses the shortcomings of previous approaches is disclosed and described herein. For example, as part of a disclosed process, a unique "token" or connection identifier is provided that includes a target data location for an organization. The token is provided as a cluster routing controller (CRC) entry for the organization that can be modified without the organization's knowledge. When the CRC entry for the organization is modified clusters and indexes for incoming requests can be instantly switched.

This approach provides flexibility and cost effectiveness: instead of storing connection details directly in a database organization record or the like, an organization simply is associated with the CRC token. The CRC token can be straightforwardly changed in CRC to a different value, resulting in an organization's searches instantly being redirected to an entirely different target location that that has the capacity to accommodate the organization's growth.

Referring again to FIG. 1B, in an embodiment, tenant management process space 110 can include a system 200 for organization extensibility and cluster scalability. In an embodiment, the system 200 can change an entry in a cluster routing controller that instantly switches clusters and indexes for incoming requests. In this manner, resources for organizations that have experienced growth can be increased without any interruption in the services that are provided the organization. As a part of the operation of system 200, system 200 determines whether a level of resource utilization of an organization having a first index and a first cluster requires that the organization is assigned to a second cluster. As used herein, an "index" is intended to refer to a logical partitioning of data. Moreover, as used herein, a "cluster" is intended to refer to a storage location where searchable data is maintained. If system 200 determines that the level of resource utilization of the organization having the first index entry and a first cluster requires that the organization is assigned to the second cluster, a second index entry for the organization in the second cluster is created. A consul entry is added to a consul that points to the second index entry, and upon completion of a data migration operation, a cluster routing controller entry for the organization is changed, from the first index entry to the second index entry. Details of the operation of system 200 are described with reference to FIGS. 1C and 1D below.

Operation

Figure 1C:
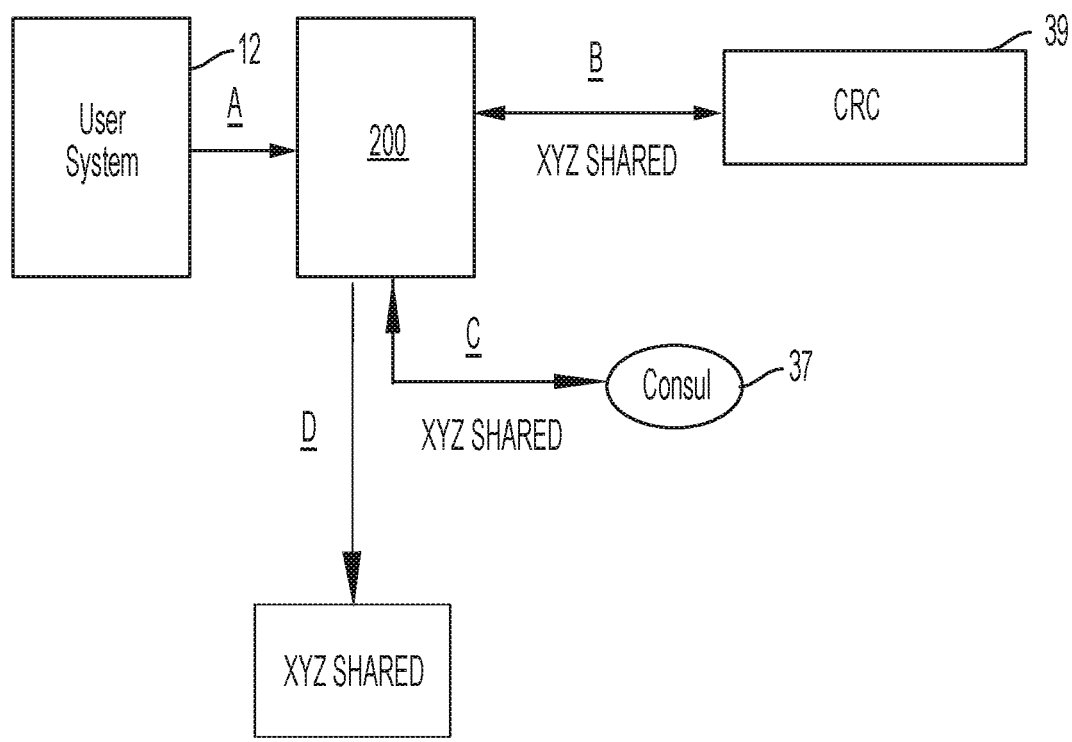
FIGS. 1C and 1D illustrate the operation of a system for organization extensibility and duster scalability according to an embodiment.
Figure 1D:
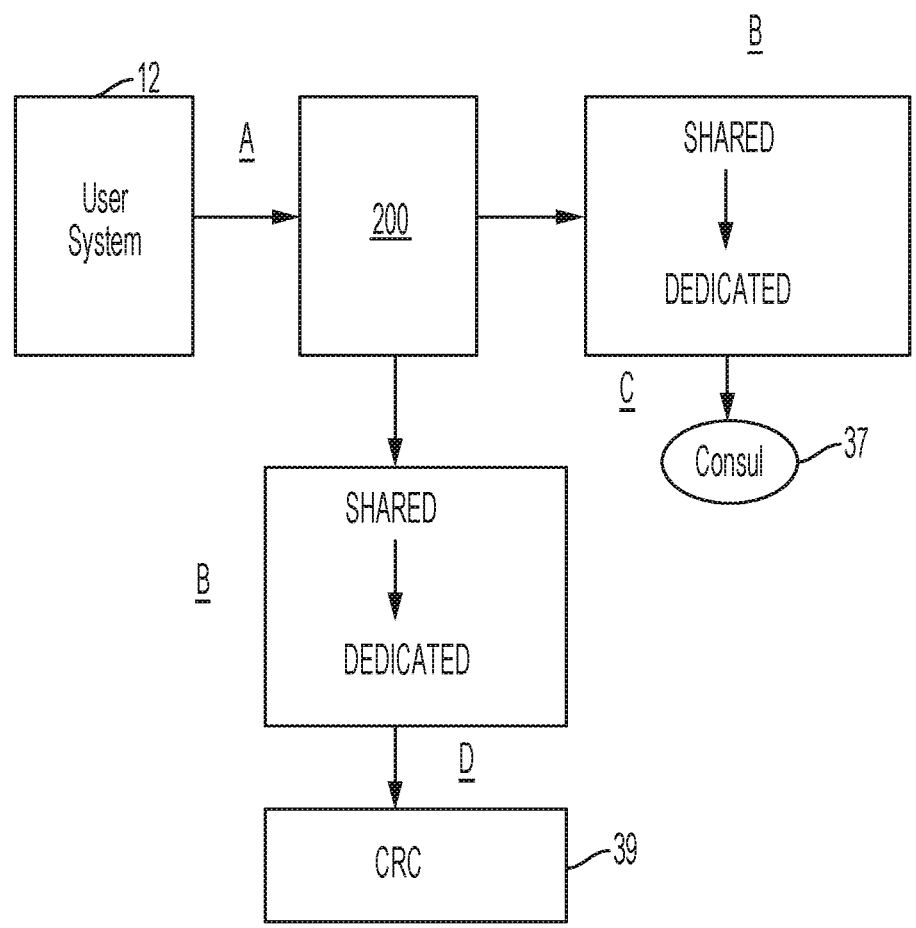

FIGS. 1C and 1D illustrate the operation of the system 200 for organization extensibility and duster scalability. In FIGS. 1C and 1D, the operations illustrate the interaction of the system 200 with a consul 37 and a duster routing controller (CRC) 39 of an activity indexing infrastructure as a part of providing organization extensibility and duster scalability.

Search Operation

Referring to FIG. 1C, at A, a request for organization search data is made from user system 12. In an embodiment, the organization is a tenant (as described herein above with reference to FIGS. 1A and 1B) that communicates requests for search data via user system 12. In an embodiment, the request is accessed by system 200 and forwarded to the CRC 39.

At B, based on the request, a connection identifier or "token" for the organization's search data is retrieved from the CRC 39.

At C, using the identifier, further details (e.g., connection specific information) are retrieved from the consul. In an embodiment, the connection specific information can include but are not limited to hostname, port, index name, token, etc.

At D, the connection specific information is used to make a connection (such as to a cluster) such that the organizations search data can be accessed.

Cluster Provisioning Operation

Referring to FIG. 1D, at A, system 200 determines whether a level of resource utilization of an organization assigned a first index and a first cluster requires that the organization be assigned to a second cluster. In an embodiment, the first index can be associated with a plurality of clusters of search data. In an embodiment, the clusters can include sets of related search data (e.g., that correspond to respective organizations). In an embodiment, the second cluster can be a data storage location that provides ample space for current and future growth of the organization.

At B, system 200 creates an index for the organization in the second cluster. In an embodiment, the index for the organization can be a dedicated index. In an embodiment, a dedicated index is an index that is assigned to a single organization. FIG. 1D illustrates the causing of the change by system 200 from the original shared index to the dedicated index.

At C, a consul entry is added to the consul 37 that points to the dedicated index. In an embodiment, the consul 37 can be used to maintain connection specific information that can include but is not limited to hostname, port, index name, token, etc.

At D, upon completion of a data migration operation, the CRC 39 entry for the organization is changed from the original index to the dedicated index. In an embodiment, system 200 can automatically modify the CRC 39 entry for the organization from the original index to the dedicated index. In other embodiments, other manner of modifying the CRC 39 entry for the organization can be used. In an embodiment, this process instantly switches clusters and indexes for incoming requests from the organization.

Figure 1E:
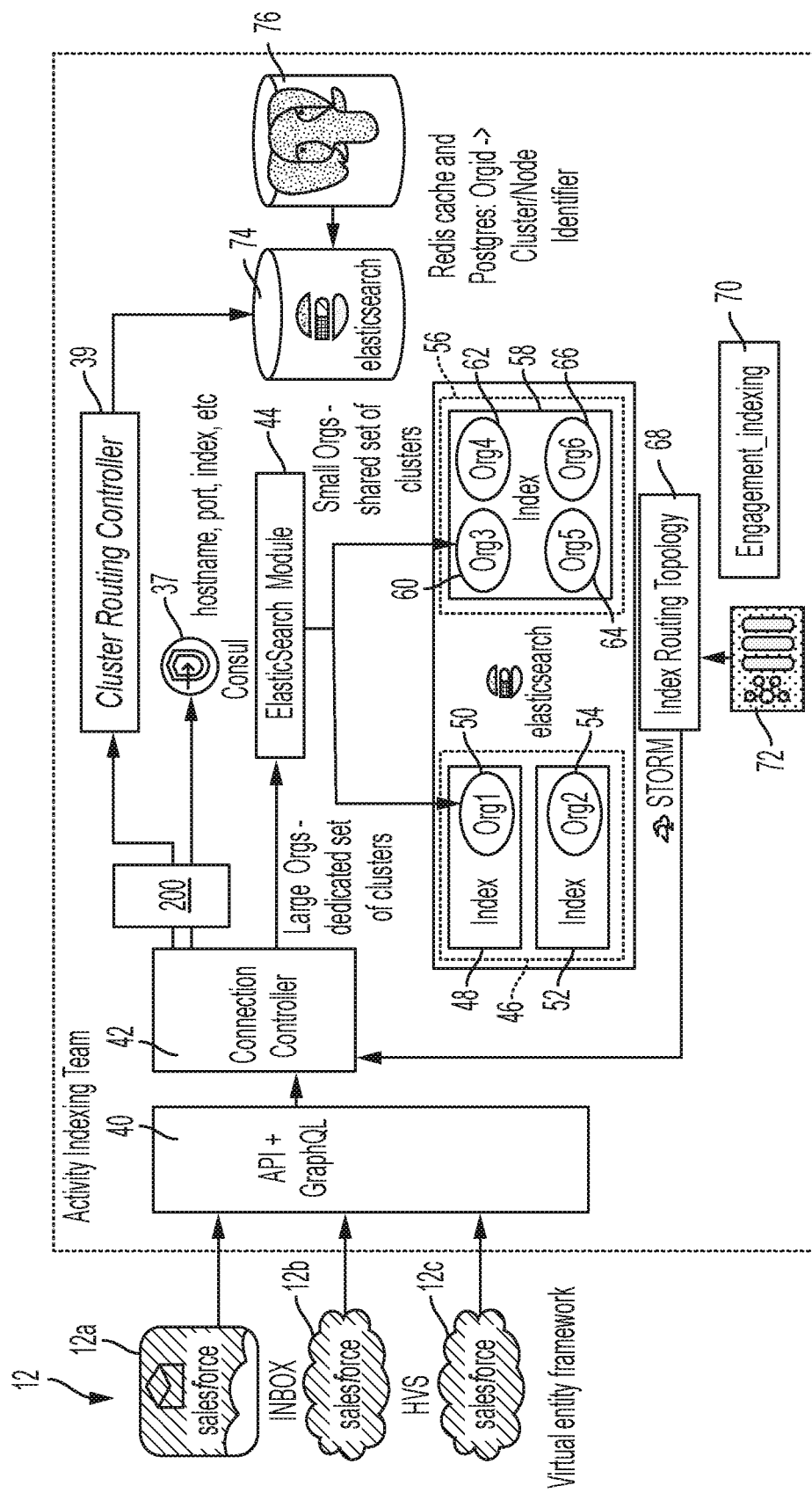
FIG. 1E shows an example implementation of an indexing infrastructure that includes the system for organization extensibility and duster scalability according to an embodiment.

FIG. 1E shows an example implementation of an activity indexing infrastructure that includes system 200 according to an embodiment. Moreover, FIG. 1E shows the interrelationship of system 200 with other components of the activity indexing infrastructure. In addition to user system 12, consul 37, CRC 39 and system 200, FIG. 1E shows API 40, connection controller 42, search module 44, cluster 46, index 48, organization search data 50, index 52, organization search data 54, cluster 56, index 58, organization search data 60, organization search data 62, organization search data 64, organization search data 66, index routing topology 68, index routing topology inputs 70 and 72, cache 74 and cache input 76. In an embodiment, as shown in FIG. 1E, an example user system 12 can include but is not limited to email 12a, high velocity sales (HVS) 12b, and virtual entity framework 12c.

Referring to FIG. 1E, the system 200 addresses the need to enable changes in organization search data location without having to make changes in a database organization record in an environment where each milliseconds counts by providing a unique token that represents an organization search data location. For example, for a hypothetical request involving an organization with an organization Id "123", the CRC 39 can assign a token "ABC" that represents a target data location that has been deemed suitable for the organization. (This is a first layer of indirection.) The consul 37 can map the token ABC to an actual hostname, port, index name(s), token, etc. (second layer of indirection). Thereafter, the mapping can be used to instantiate a new search connection via the search module 44.

As regards organization extensibility, with reference to FIG. 1E, an end-to-end example, involving an organization XYZ, is described. Initially, because its overall business size is small, the organization XYZ is assigned to a search cluster where several organizations share the same cluster and index (token "SHARED326") such as search cluster 56. Months later, organization XYZ begins to experience exponential growth. As a result, organization XYZ begins to monopolize the resources of the initially assigned search cluster 56. To accommodate the exponential growth of organization XYZ, organization XYZ's search data is moved to a different cluster such as cluster 46 and given its own dedicated index "DEDICATED-XYZ". As part of the process of moving the search data to cluster 46, system 200 identifies cluster 46 as being a cluster that can provide ample space for growth. The new index "DEDICATED-XYZ" is created there for organization XYZ, and a consul entry is added to consul 37 that points to the new index. Once data migration is complete, the system 200 modifies the entry in CRC 39 for organization XYZ from "SHARED326" to "DEDICATED-XYZ"— instantly switching clusters and indexes for incoming requests. In an embodiment, organization XYZ may not have knowledge that the process has occurred.

Thus, a token can be straightforwardly changed in the CRC 39 to a different value, resulting in an organization's searches instantly being redirected to an entirely different target location. In addition, the token itself, when queried in the consul 37, can also have its consul details straightforwardly modified—for example, if a port number should be changed.

Referring to FIG. 1E, request from user systems 12 are received by API 40 and are forwarded to connection controller 42. In an embodiment, index routing topology 68 is determined from index routing topology inputs 70 and 72. In an embodiment, the cache 74 stores cache input 76 (cluster and node data and corresponding organization identifiers).

In an embodiment, although system 200, CRC 39 and consul 37 can be separate, as shown in FIG. 1E, in other embodiments, these elements can be integrated.

Components of System for Organization Extensibility and Cluster Scalability

Figure 2:
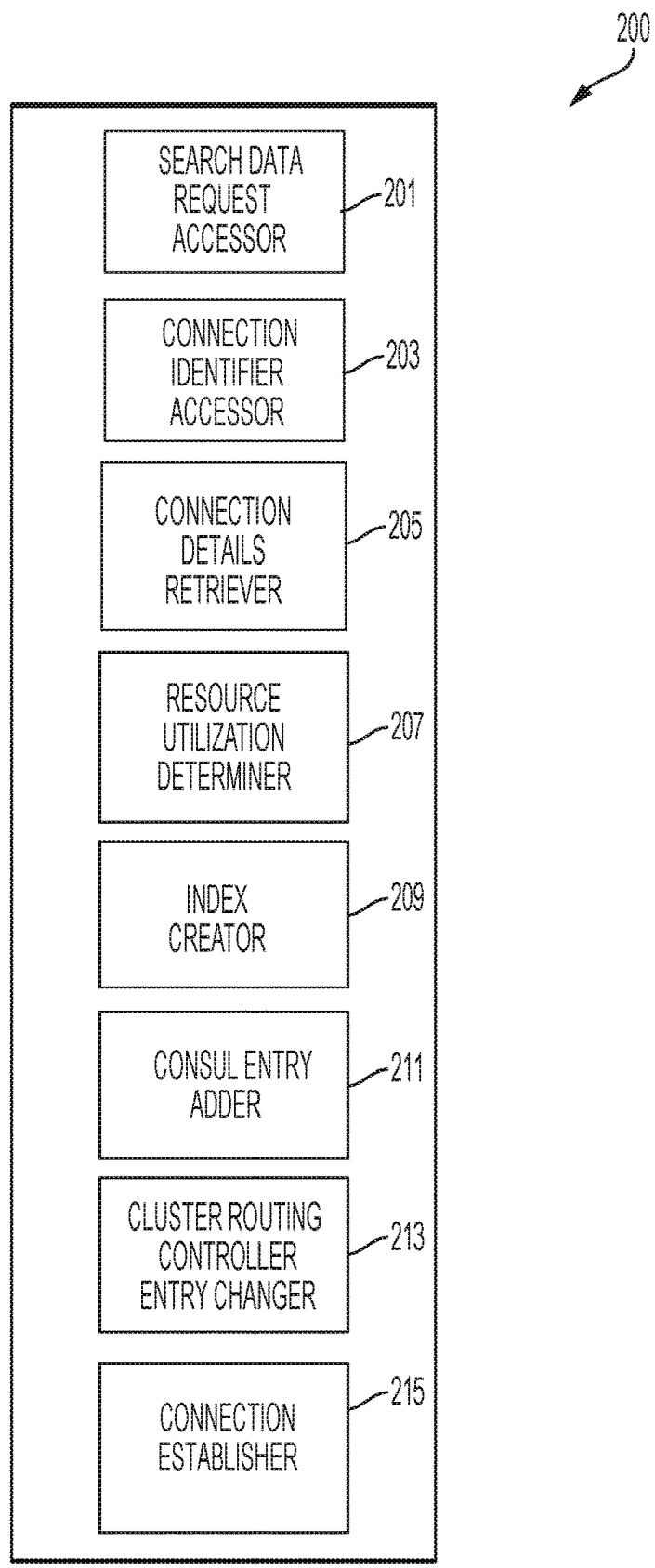
FIG. 2 shows components of the system for organization extensibility and duster scalability according to an embodiment.

FIG. 2 shows components of the system 200 for organization extensibility and duster scalability according to an embodiment. In the FIG. 2 embodiment, search data request accessor 201, connection identifier accessor 203, connection details retriever 205, resource utilization determiner 207, index creator 209, consul entry adder 211, cluster routing controller entry changer 213 and connection establisher 215.

Referring to FIG. 2, search data request accessor 201 accesses requests for organization search data. In an embodiment, a request for organization search data is accessed by system 200 from an organization and forwarded to the CRC 39.

Connection identifier accessor 203, based on a request for organization search data, accesses a connection identifier for the organization's search data from the CRC. In an embodiment, the CRC maintains the connection identifier for the organization's search data. In an embodiment, the connection identifier can be referred to as a "token."

Connection details retriever 205, using the connection identifier, retrieves connection details (connection specific information) from the consul, hi an embodiment, the additional details can include but are not limited to a hostname, port, index name, and token.

Resource utilization determiner 207 determines whether a level of resource utilization of an organization having a first index and a first cluster requires that the organization is assigned to a second cluster. In an embodiment, the first index can be associated with a plurality of organizations. In an embodiment, the clusters can include sets of related search data (e.g., that correspond to respective organizations). In an embodiment, the second cluster can be a data storage location that provides ample space for current and future growth of the organization.

Index creator 209, in response to a determination that the resource utilization of an organization requires that the organization be assigned to a different cluster, creates an index for the organization in the second cluster. In an embodiment, the index for the organization that is created in the second cluster can be a dedicated index.

Consul entry adder 211, in response to the creation of an index for the organization in the second cluster, adds an entry to the consul that points to the index for the organization in the second cluster. In an embodiment, the consul can contain data that includes but is not limited to hostname, port, index name, token, etc.

Cluster routing controller entry changer 213 upon completion of a data migration operation, changes the cluster routing controller entry for the organization from the first index to the second index. For example, once data migration is complete, the CRC's entry for the organization can be modified from the first index to the second index. In an embodiment, this process instantly switches clusters and indexes for incoming requests. In an embodiment, this process can be completed without the knowledge of the organization.

Connection Establisher 215 establishes a connection to the assigned cluster for accessing the organization's search data based on current connection specific information.

Figure 3:
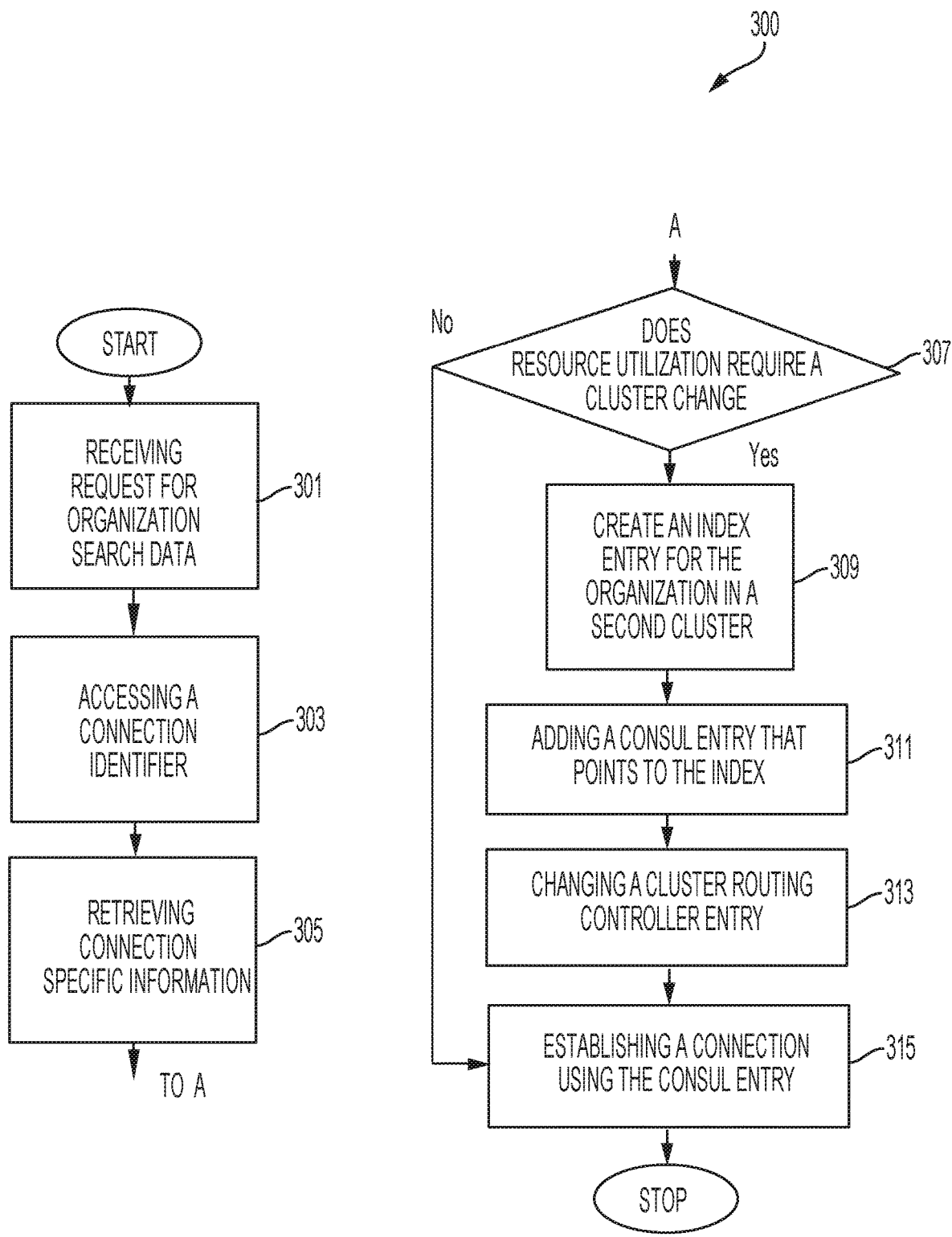
FIG. 3 is a flowchart of a method for organization extensibility and duster scalability according to an embodiment.

FIG. 3 is a flowchart of a method for organization extensibility and duster scalability according to an embodiment. The method includes, at 301, receiving a request for the search data of an organization. At 303, accessing a connection identifier from a cluster routing controller. At 305, retrieving connection specific information from a consul. At 307, determining whether a level of resource utilization of the organization (with a first index entry and a first assigned cluster) requires that the organization is assigned to a second cluster. If it is determined that a level of resource utilization of the organization requires that the organization is assigned to a second cluster, the method proceeds to 309. If it is determined that a level of resource utilization of the organization does not require that the organization is assigned to a second cluster, the method proceeds to 315. The method further includes, at 309, if it is determined that the level of resource utilization requires that the organization is assigned to the second cluster, creating a second index entry for the organization in the second cluster. At 311, adding a consul entry in the consul that points to the second index. At 313, upon completion of a data migration operation, changing the cluster routing controller entry for the organization, from the first index entry to the second index entry. At 315, establishing a connection using the consul entry.

In an embodiment, the changing the cluster routing controller entry corresponds to an increase in the size of the organization. In an embodiment, the cluster routing controller provides a connection identifier for the organization that is used to retrieve connection specific information. In an embodiment, the connection specific information is provided to a search module that provides a connection to a cluster. In an embodiment, the first cluster is associated with a single index and contains search data of a plurality of organizations. In an embodiment, the second index is dedicated to the organization. In an embodiment, the consul entry includes connection specific information including hostname, port, index name, and token.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations (e.g., system 200 and components of system 200, etc.) can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood they have been presented by way of example only, and not limitation. Thus, the breadth and scope of the present application should not be limited by any of the implementations described herein, but should be defined only in accordance with the following and later-submitted claims and their equivalents.

What is claimed is:

1. A non-transitory computer-readable media (NTCRM) comprising instructions for operating a cloud computing system stored thereon, wherein execution of the instructions by the cloud computing system causes the cloud computing system to perform a method comprising:
   determining whether a level of resource utilization of an organization (org) having a first index pointing to a first cluster in the cloud computing system requires assignment of the org to a second cluster in the cloud computing system;
   creating, for the org, a second index pointing to the second cluster when the level of resource utilization requires the assignment of the org to the second cluster;
   adding a consul entry in a consul that points to the second index;
   changing an entry of a cluster routing controller for the org from the first index to the second index after the org's data has been migrated from the first cluster to the second cluster; and
   establishing a connection to the second cluster using the consul entry.

2. The NTCRM of claim 1, wherein the method performed based on execution of the instructions further comprises:
   prior to the determining, receiving a request for search data of the org;
   accessing a connection identifier from the cluster routing controller; and retrieving connection specific information from the consul.

3. The NTCRM of claim 1, wherein the changing of the cluster routing controller entry corresponds to an increase in a size of the org.

4. The NTCRM of claim 1, wherein the cluster routing controller provides a connection identifier for the org that is used to retrieve connection specific information.

5. The NTCRM of claim 4, wherein connection specific information is provided to a search module that provides a connection to a cluster.

6. The NTCRM of claim 1, wherein the first cluster is associated with a single index and contains search data of a plurality of orgs.

7. The NTCRM of claim 1, wherein the second index is dedicated to the org.

8. The NTCRM of claim 1, wherein the consul entry includes connection specific information including hostname, port, index name, and token.

9. A non-transitory computer-readable medium (NTCRM) having instructions for operating a cloud computing service stored thereon that, in response to execution of the instructions by one or more compute nodes of the cloud computing service causes the one or more compute nodes to perform operations including:
- determining whether a level of resource utilization of an organization (org) having a first index and assigned to a first cluster of the cloud computing service requires migration of the org to a second cluster of the cloud computing service;
- creating a second index for the org for the second cluster;
- adding a consul entry to a consul that points to the second index;
- upon completion of a data migration operation from the first cluster to the second cluster changing an entry of a cluster routing controller for the org, from the first index to the second index; and
- establishing a connection using the consul entry.

10. The NTCRM of claim 9, further comprising:
- receiving a request for search data of the org prior to the determination of the level of resource utilization;
- accessing a connection identifier from the cluster routing controller; and
- retrieving connection specific information from the consul.

11. The NTCRM of claim 9, wherein the changing of the cluster routing controller entry corresponds to an increase in a size of the org.

12. The NTCRM of claim 9, wherein the cluster routing controller provides a connection identifier for the org with connection specific information.

13. The NTCRM of claim 12, wherein connection specific information is provided to a search module that provides a connection to a cluster.

14. The NTCRM of claim 9, wherein the first cluster is associated with a single index and contains search data of a plurality of orgs.

15. The NTCRM of claim 9, wherein the second index is dedicated to the org.

16. The NTCRM of claim 9, wherein the consul entry includes hostname, port, index name, and token.

17. A cloud computing system, comprising:
- a set of clusters, wherein each cluster in the set of clusters is a storage location in the cloud computing system assigned to one or more subscribing organizations (orgs) of a set of subscribing orgs, the set of clusters includes a first cluster having a first index pointing to the first cluster, and the first cluster is assigned to at least an individual org among the set of subscribing orgs; and
- at least one computing device including at least one processor and at least one memory device storing instructions, wherein execution of the instructions by the at least one processor causes the at least one computing device to perform steps including:
- determine whether a level of resource utilization of the individual org requires assignment of the individual org to a second cluster of the set of clusters;
- create a second index for the individual org in the second cluster;
- add a consul entry to a consul that points to the second index;
- change, upon completion of a data migration operation, an entry in a cluster routing controller for the individual org, from the first index to the second index; and
- establish a connection using the consul entry.

18. The cloud computing system of claim 17, wherein execution of the instructions by the at least one processor causes the at least one computing device to perform steps including:
- receiving, prior to the determination, a request for search data of the individual org;
- access a connection identifier from the cluster routing controller; and
- retrieve connection specific information from the consul.

19. The cloud computing system of claim 17, wherein the change of the entry in the cluster routing controller corresponds to an increase in a size of the individual org.

20. The cloud computing system of claim 17, wherein the cluster routing controller provides a connection identifier for the individual org with connection specific information.

* * * * *